(12) United States Patent
Miyata et al.

(10) Patent No.: US 9,168,899 B2
(45) Date of Patent: Oct. 27, 2015

(54) FLUID PRESSURE BOOSTER AND FLUID PRESSURE BRAKE APPARATUS HAVING THE SAME

(75) Inventors: Yoshihiro Miyata, Anjyo (JP); Shigemitsu Nohira, Kariya (JP)

(73) Assignee: ADVICS CO., LTD., Aichi-ken (JP)

( * ) Notice: Subject to any disclaimer, the term of this patent is extended or adjusted under 35 U.S.C. 154(b) by 198 days.

(21) Appl. No.: 13/434,952

(22) Filed: Mar. 30, 2012

(65) Prior Publication Data

US 2012/0248860 A1 Oct. 4, 2012

(30) Foreign Application Priority Data

Mar. 30, 2011 (JP) .................................. 2011-075531

(51) Int. Cl.
| | |
|---|---|
| *B60T 8/44* | (2006.01) |
| *B60T 7/04* | (2006.01) |
| *B60T 13/14* | (2006.01) |
| *B60T 13/66* | (2006.01) |

(Continued)

(52) U.S. Cl.
CPC ................ *B60T 7/042* (2013.01); *B60T 8/4275* (2013.01); *B60T 8/441* (2013.01); *B60T 13/147* (2013.01); *B60T 13/662* (2013.01); *B60T 13/686* (2013.01)

(58) Field of Classification Search
CPC ....... B60T 8/4013; B60T 8/441; B60T 8/442; B60T 8/4845; B60T 13/14; B60T 13/142; B60T 13/143; B60T 13/144; B60T 13/145; B60T 13/146; B60T 8/4068
USPC .......... 303/113.3, 114.1, 114.2, 115.1, 115.4, 303/115.5, 87; 60/547.1
See application file for complete search history.

(56) References Cited

U.S. PATENT DOCUMENTS

| | | |
|---|---|---|
| 4,548,037 A | 10/1985 | Farr |
| 4,708,404 A | 11/1987 | Seibert et al. |
| 4,730,877 A | 3/1988 | Seibert et al. |

(Continued)

FOREIGN PATENT DOCUMENTS

| | | |
|---|---|---|
| CN | 1299754 A | 6/2001 |
| CN | 1827437 A | 9/2006 |

(Continued)

OTHER PUBLICATIONS

Office Action (First Office Action) and Search Report issued on Mar. 23, 2015, by the State Intellectual Property Office of People's Republic of China in corresponding Chinese Patent Application No. 201210091797.1 and an English Translation of the Office Action and Search Report. (17 pages).

*Primary Examiner* — Nicholas J Lane
(74) *Attorney, Agent, or Firm* — Buchanan Ingersoll & Rooney PC

(57) ABSTRACT

A fluid pressure booster and a fluid pressure brake apparatus having the fluid pressure booster are provided. The fluid pressure booster includes an auxiliary fluid pressure source including a power-operated pump and a pressure accumulator, a pressure adjusting device which adjusts fluid pressure supplied from the auxiliary fluid pressure source to a value corresponding to an operating amount of a brake operation member by displacement of a spool valve and introduces the adjusted fluid pressure into a boost chamber, a boost piston which receives the fluid pressure introduced into the boost chamber to generate assist force and operates a master piston of a master cylinder by assisted force, and a damper chamber which communicates with one or both of the boost chamber and a pressure chamber of the master cylinder.

7 Claims, 9 Drawing Sheets

(51) Int. Cl.
  *B60T 13/68* (2006.01)
  *B60T 8/42* (2006.01)

(56) References Cited

U.S. PATENT DOCUMENTS

| | | | |
|---|---|---|---|
| 4,750,789 A | | 6/1988 | Belart et al. |
| 4,876,853 A | * | 10/1989 | Shirai et al. .................. 60/547.1 |
| 5,590,936 A | * | 1/1997 | Reuter ........................ 303/116.1 |
| 6,347,841 B1 | * | 2/2002 | Kim ................................. 303/87 |
| 6,412,882 B1 | * | 7/2002 | Isono et al. ................. 303/114.1 |
| 2002/0096936 A1 | * | 7/2002 | Ishida et al. ............... 303/114.1 |
| 2006/0197373 A1 | * | 9/2006 | Kanagawa et al. ............. 303/11 |
| 2008/0236971 A1 | | 10/2008 | Suzuki et al. |
| 2008/0258545 A1 | * | 10/2008 | Drumm ....................... 303/114.1 |
| 2012/0074769 A1 | * | 3/2012 | Sakata ............................. 303/11 |
| 2012/0248861 A1 | * | 10/2012 | Miyata et al. ................... 303/10 |
| 2013/0175851 A1 | * | 7/2013 | Honda et al. ................. 303/6.01 |

FOREIGN PATENT DOCUMENTS

| | | |
|---|---|---|
| JP | 2002-67919 A | 3/2002 |
| JP | 2002-264797 A | 9/2002 |
| JP | 2006240542 A | 9/2006 |
| JP | 2008-254467 A | 10/2008 |

* cited by examiner

FLUID PRESSURE BOOSTER AND FLUID PRESSURE BRAKE APPARATUS HAVING THE SAME

CROSS REFERENCE TO RELATED APPLICATIONS

This application is based on and claims priority under 35 U.S.C.§119 to Japanese Patent Application 2011-075531, filed on Mar. 30, 2011, the entire content of which is incorporated herein by reference.

BACKGROUND

1. Field of the Invention

The present invention relates to a fluid pressure booster which generates assist force corresponding to an operating amount of a brake operation member by using fluid pressure supplied from an auxiliary fluid pressure source and applies assisted force to a master cylinder, and a fluid pressure brake apparatus having the fluid pressure booster.

2. Description of Related Art

For example, U.S. Pat. No. 4,548,037 B discloses a basic technique of a fluid pressure booster which adjusts fluid pressure supplied from an auxiliary fluid pressure source having a power-operated pump and a pressure accumulator, to a value corresponding to an operating amount of a brake operation member with a pressure adjusting device having a spool valve, introduces the same into a boost chamber, applies the fluid pressure to a boost piston to generate assist force corresponding to the brake operating amount and applies assisted force (force obtained by adding the assist force to brake operating force applied by a vehicle driver) to a piston of a master cylinder.

Also, there has been known a fluid pressure brake apparatus having a reflux-type pressure adjusting unit which performs an ABS (antilock brake system) control or ESC (Electronic Stability Control) operation based on a command from an electronic control unit.

When the electronic control unit determines that it is necessary to decrease pressure of a wheel cylinder, based on information from a variety of sensors detecting wheel speed, operating stroke of a brake operation member, brake fluid pressure, movement of a vehicle and the like, the reflux-type pressure adjusting unit cuts off a fluid pressure path extending from the master cylinder to the wheel cylinder by a pressure increase solenoid valve and connects the wheel cylinder to a low pressure fluid storage by a pressure decrease solenoid valve, thereby performing pressure decrease control.

After that, when the electronic control unit determines that it is necessary to perform the pressurization again, the reflux-type pressure adjusting unit drives a power-operated reflux pump to pump up brake fluid in the low pressure fluid storage, opens the pressure increase solenoid valve and closes the pressure decrease solenoid valve, thereby refluxing the pumped brake fluid to the fluid pressure path extending from the master cylinder to the wheel cylinder.

Regarding the fluid pressure brake apparatus adopting the reflux-type pressure adjusting unit, two types are suggested. In one type device, a cutoff valve is provided at a more upstream side (master cylinder-side) than a position (reflux point) at which the brake fluid pumped by the reflux pump is introduced to the fluid pressure path extending from the master cylinder to the wheel cylinder, and the cutoff valve is closed when the control such as ABS is performed. In the other type device, the cutoff valve is not provided.

In the latter device having no cutoff valve, the brake fluid pumped by the reflux pump flows backward toward the master cylinder (hereinafter referred to as 'pump back').

According to the related-art fluid pressure brake apparatus having the reflux-type pressure adjusting unit, regarding a booster which is provided so as to assist a braking operation of a driver, a vacuum booster has been adopted which generates assist force by using a negative pressure of an engine. However, since it is not possible to expect the assist by the negative force of the engine in a valve matic vehicle in which an intake valve lift amount is continuously varied to enable an intake value to function as a throttle valve, an HEV (hybrid electric vehicle), an EV (Electric Vehicle) and the like. Therefore, it is considered to combine a fluid pressure booster. The fluid pressure booster applies fluid pressure (boost pressure) introduced into a boost chamber to a boost piston, thereby generating the assist force.

However, when the fluid pressure booster is adopted instead of the vacuum booster, the precision of the pressure adjustment is lowered due to the pump back, so that an operation feeling of the brake and the durability of a cup of the master cylinder are thus deteriorated. Therefore, measures capable of avoiding the problems are needed.

That is, when the pump back occurs, the piston of the master cylinder is pushed back by the fluid pressure flowing backward from the pressure adjusting unit. The pushing force is transferred to the boost piston (which is referred to as a power piston in the vacuum booster), so that the boost piston is also pushed back.

In the fluid pressure brake apparatus adopting the vacuum booster which operates a power piston by a pressure difference between a negative pressure chamber and an atmosphere chamber and thus generates the assist force, even when the power piston is pushed back, since the air sealed in the atmosphere chamber is compressed by displacement of the power piston, the pressure in the atmosphere chamber is not increased much and the influence of the pump back is suppressed to a slight amount.

Compared to the vacuum booster, according to the fluid pressure booster, brake fluid sealed in the boost chamber is compressed as the boost piston is pushed back due to the pump back, and the brake fluid is non-compressible oil. Therefore, the pressure increase in the boost chamber is not negligible until a discharge port, which enables the boost chamber to communicate with a reservoir, is opened.

For the fluid pressure brake apparatus in which electronic control of the wheel cylinder pressure is made by so-called differential pressure control, a pressure increase, which corresponds to the increase of the master cylinder pressure due to the pump back, occurs in the boost chamber, so that the master cylinder pressure is increased to balance with the boost pressure. Therefore, there would be caused the lowering of the control precision of the wheel cylinder pressure, which deteriorates the reliability of the ABS control and the like, the pulsation, which deteriorates the durability of the cup of the master cylinder and the like, the deterioration of the operation feeling of the brake and the like.

Also, in the fluid pressure brake apparatus in which the pressure adjusting control of the wheel cylinder by the electronic control is made by pulse control, when the boost pressure is increased by the pump back in a pressure boost mode, an introduction amount of the fluid pressure into the wheel cylinder is more increased than a target amount. Accordingly, there would be also caused the lowering of the control reliability, the deterioration of the operation feeling and the like although the degrees thereof are less than those in the fluid pressure brake apparatus adopting the differential pressure control.

SUMMARY

Accordingly, an object of the present invention is to suppress the deterioration of the control precision of the wheel cylinder pressure, the pulsation influencing the durability of the cup of the master cylinder and the deterioration of the operation feeling of the brake, which are caused due to the pump back when the fluid pressure booster is used in combination with a reflux-type pressure adjusting unit (ABS unit or ESC unit).

According to an illustrative embodiment of the present invention, there is provided a fluid pressure booster for a fluid pressure brake apparatus, comprising: an auxiliary fluid pressure source including a power-operated pump and a pressure accumulator; a pressure adjusting device which adjusts fluid pressure supplied from the auxiliary fluid pressure source to a value corresponding to an operating amount of a brake operation member by displacement of a spool valve and introduces the adjusted fluid pressure into a boost chamber; a boost piston which receives the fluid pressure introduced into the boost chamber to generate assist force and operates a master piston of a master cylinder by assisted force; and a damper chamber which communicates with one or both of the boost chamber and a pressure chamber of the master cylinder.

According to another illustrative embodiment of the present invention, there is provided a fluid pressure brake apparatus comprising: the above fluid pressure booster; a brake operation member which applies brake operating force to the fluid pressure booster; a master cylinder having the master piston which is operated while being assisted by the fluid pressure booster; a wheel cylinder which generates braking force by fluid pressure supplied from the master cylinder; a reflux-type pressure adjusting unit including a pressure decrease solenoid valve which enables the fluid pressure of the wheel cylinder to flow out, a pressure increase solenoid valve which introduces the fluid pressure into the wheel cylinder, and a reflux pump which pumps up brake fluid having flown out from the wheel cylinder via the pressure decrease solenoid valve and thus refluxes the same to a fluid pressure path extending from the master cylinder to the wheel cylinder; and an electronic control unit which determines whether it is necessary to decrease pressure of the wheel cylinder and whether it is necessary to re-pressurize the wheel cylinder to output an operating command to the pressure decrease solenoid valve and the pressure increase solenoid valve.

According to the fluid pressure booster and the fluid pressure brake apparatus having the same, when the piston of the master cylinder and the boost piston are pushed back due to the pump back, the brake fluid is relieved from the pressure chamber of the master cylinder or the boost chamber of the booster to the damper chamber communicating with the pressure chamber or the boost chamber. Therefore, the increase of the boost pressure and the increase of the master cylinder pressure are suppressed and the control precision of the wheel cylinder pressure is stabilized, so that the reliability of the ABS control or ESC control is improved.

Also, the brake fluid is relieved from the pressure chamber of the master cylinder or the boost chamber of the booster to the damper chamber, so that the buffering effect is obtained.

Thereby, the generation of the pulsation is suppressed and the deterioration of the operation feeling of the brake is also suppressed.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, illustrative embodiments of a fluid pressure booster and a fluid pressure brake apparatus having the same are described with reference to FIGS. 1 to 9.

Figure 1:
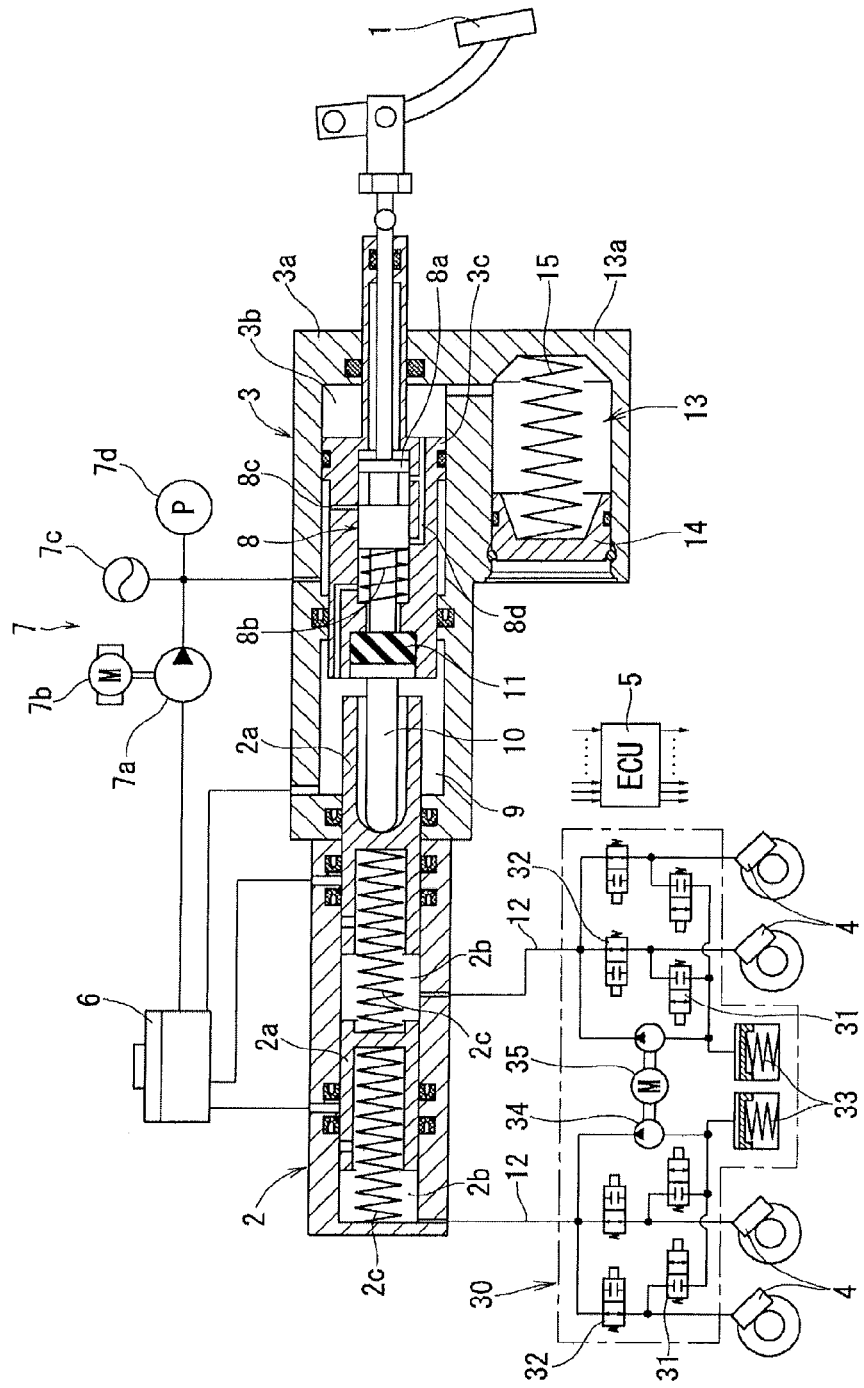
FIG. 1 is a sectional view showing an outline of a fluid pressure booster and a fluid pressure brake apparatus according to a first illustrative embodiment of the present invention.

A fluid pressure brake apparatus (first illustrative embodiment) shown in FIG. 1 includes a brake operation member (brake pedal in FIG. 1) 1, a master cylinder 2, a fluid pressure booster 3, a wheel cylinder 4 which generates braking force by fluid pressure supplied from the master cylinder 2, a reflux-type pressure adjusting unit 30 and an electronic control unit 5. A reference numeral 6 indicates a reservoir which is provided as an auxiliary fluid source. A sensor or the like which transmits information, which indicates necessity of pressure decrease and pressure increase of the wheel cylinder 4, to the electronic control unit 5 is not shown in the figure.

As an example of the master cylinder 2, a known tandem type master cylinder is shown which includes a return spring 2c pressing a master piston 2a to generate fluid pressure in a pressure chamber 2b.

The fluid pressure booster 3 has an auxiliary fluid pressure source 7 and a pressure adjusting device 8 which adjusts the fluid pressure supplied from the auxiliary fluid pressure source 7, to a value corresponding to an operating amount of the brake operation member 1 and introduces the same into a boost chamber 3b.

The fluid pressure booster 3 has a boost piston 3c which receives the fluid pressure (boost pressure) introduced into the boost chamber 3b to generate assist force and operate the master piston 2a of the master cylinder 2 by assisted force (thrust force, obtained by adding the assist force to brake operating force applied by a vehicle driver), and a damper chamber 13.

The auxiliary fluid pressure source 7 includes a pump 7a, a motor 7b driving the pump 7a, a pressure accumulator (accumulator) 7c and a pressure sensor 7d. The motor 7b is on/off based on pressure detected by the pressure sensor 7d, thereby maintaining the fluid pressure accumulated in the pressure accumulator 7c within a range of predetermined upper and lower limits.

The pressure adjusting device 8 has a spool valve 8a which receives operating force input from the brake operation member 1 and is thus displaced and a return spring 8b of the spool valve 8a. Also, the pressure adjusting device 8 has an introduction passage 8c and an exhaust passage 8d which are formed in the boost piston 3c.

The introduction passage 8c and the exhaust passage 8d are opened by displacement of the spool valve 8a. When the introduction passage 8c is opened, the boost chamber 3b is connected to the auxiliary fluid pressure source 7, and when the exhaust passage 8d is opened, the boost chamber 3b is connected to the reservoir 6 via a fluid chamber 9.

The pressure adjusting device 8 enables the boost chamber 3b to connect the auxiliary fluid pressure source 7 or the reservoir 6 and to disconnect from both the auxiliary fluid pressure source 7 and the reservoir 6, depending on the displacement of the spool valve 8a. By the operation of the pressure adjusting device 8, the fluid pressure (boost pressure) which is introduced from the auxiliary fluid pressure source 7 to the boost chamber 3 is adjusted to a value corresponding to an operating amount of the brake operation member. Since the pressure adjusting mechanism is known, the detailed description thereof is omitted.

The boost piston 3c is moved forward by the boost pressure of the boost chamber 3b and the thrust force (assisted force) is transferred to the master cylinder 2 via a power transmission member 10, so that the master piston 2a is operated and brake fluid pressure is generated in the pressure chamber 2b. In the tandem master cylinder, when the right master cylinder 2a of FIG. 1 is operated and the fluid pressure is thus generated in the right pressure chamber 2b, the left master cylinder 2a is also operated by the fluid pressure and the fluid pressure of the same pressure as the right is also generated in the left pressure chamber 2b.

The pressure generated in the respective pressure chambers 2b of the master cylinder has a value which balances with the boost pressure of the boost chamber 3b. Reaction force of the pressure generated in the pressure chambers 2b is transferred from the master piston 2a to the brake operation member 1 through the power transmission member 10, a rubber disk 11 and the spool valve 8a. The rubber disk 11 generates reaction force in correspondence to the brake operating amount. The rubber disk 11 is a preferable element but is not necessarily required.

In the first illustrative embodiment, the damper chamber 13 is formed in a body 13a which is integrated with a housing 3a of the fluid pressure booster 3. An opening of a hole which is provided to the body 13a is liquid-tightly sealed by a plug 14 to form the damper chamber 13 communicating with the boost chamber 3b and having a constant volume. A reference numeral 15 indicates a spring for plug fixation. The plug 14 may be fixed by a screw or caulking fixation, instead of the spring for plug fixation.

The larger the volume of the damper chamber 13, the effect of the damper chamber is increased. A specific size of the damper chamber 13 may be made to be larger than the maximum volume (volume which is formed when the boost piston 3c is fully stroked) of the boost chamber 3b, for example.

The reflux-type pressure adjusting unit 30 is a known unit and includes a pressure decrease solenoid valve 31 which enables the fluid pressure of the wheel cylinder 4 to flow out, a pressure increase solenoid valve 32 which introduces the fluid pressure into the wheel cylinder 4, a low pressure fluid storage 33 which temporarily receives the brake fluid having flown out from the wheel cylinder 4 via the pressure decrease solenoid valve 31, a reflux pump 34 which pumps up the brake fluid having flown out from the wheel cylinder 4 and thus refluxes the same to a fluid pressure path 12 extending from the master cylinder 2 to the wheel cylinder 4 and a motor 35 which drives the reflux pump 34.

The pressure decrease solenoid valve 31 and the pressure increase solenoid valve 32, which configure the reflux-type pressure adjusting unit 30, may be on/off type solenoid valves or known linear solenoid valves in which a degree of opening of a valve part is adjusted depending on an amount of current to be supplied to a coil.

According to the fluid pressure brake apparatus of FIG. 1 configured as described above, when the reflux-type pump 34 is driven in response to a command from the electronic control unit 5 during the braking, the pump back occurs and the master piston 2a of the master cylinder and the boost piston 3c are pushed back. At this time (when the reflux-type pump 34 is driven), the boost chamber 3b is separated and sealed from the reservoir 6 and the auxiliary fluid pressure source 7. However, when the boost piston 3c is pushed back, the brake fluid in the boost chamber 3b is relieved to the damper chamber 13 which has room for compression. Therefore, the increase in pressure of the boost chamber 3b is suppressed and thus the increase in pressure of the master cylinder is also suppressed, so that the control precision of the wheel cylinder pressure is stabilized. As a result, the reliability of the ABS control or ESC control is improved.

Figure 2:
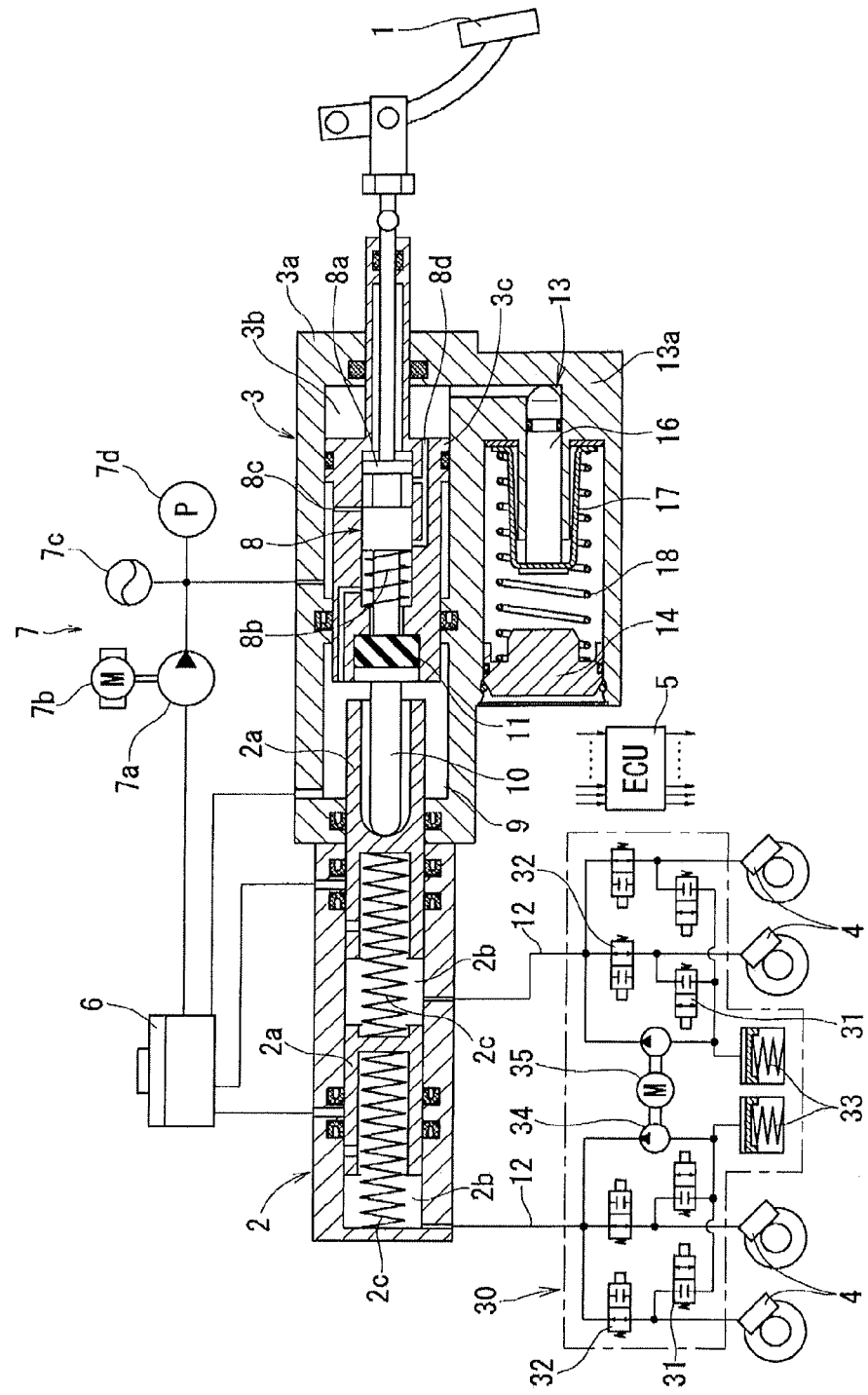
FIG. 2 is a sectional view showing an outline of a fluid pressure booster and a fluid pressure brake apparatus according to a second illustrative embodiment of the present invention.

FIG. 2 shows a fluid pressure brake apparatus of a second illustrative embodiment. The fluid pressure brake apparatus of FIG. 2 has the damper chamber 13 which is configured as a variable volume-type chamber. That is, only the configuration of the damper chamber 13 is different from the first illustrative embodiment. Thus, the same elements as those of the first illustrative embodiment are indicated with the same reference numerals and the descriptions thereof are omitted and only differences from the first illustrative embodiment are described (which is also the same in third and fourth illustrative embodiments).

The damper chamber 13 of the fluid pressure brake apparatus of the second illustrative embodiment is provided with a piston 16 which is displaced as one end thereof receives the fluid pressure of the boost chamber 3b communicating with the damper chamber 13, a spring 18 which applies returning force to the piston via a retainer 17 and a plug 14 which closes an opening of a hole accommodating therein the spring 18.

According to the damper chamber 13 of FIG. 2, when the pump back occurs and thus the boost piston 3c is pushed back, the fluid pressure of the boost chamber 3b is applied to one end of the piston 16 and thus the piston is moved leftward in FIG. 2. Thereby, the volume of the damper chamber 13 is increased and the fluid pressure of the boost chamber 3b is relieved to the damper chamber 13, so that the boosting of the boost pressure and the boosting of the master cylinder pressure are suppressed.

In the meantime, if initial load of the spring 18 is set such that the spring is not compression-deformed when the master cylinder pressure is equal to or lower than the lowest operating pressure (lowest operating pressure of the ABS control on a road surface having a low frictional coefficient μ) of the reflux-type pressure adjusting device, the pressure of the boost chamber is prevented from being relieved to the damper chamber when it is not necessary. Thus, the initial load of the spring is preferably set, considering such situation.

Figure 3:
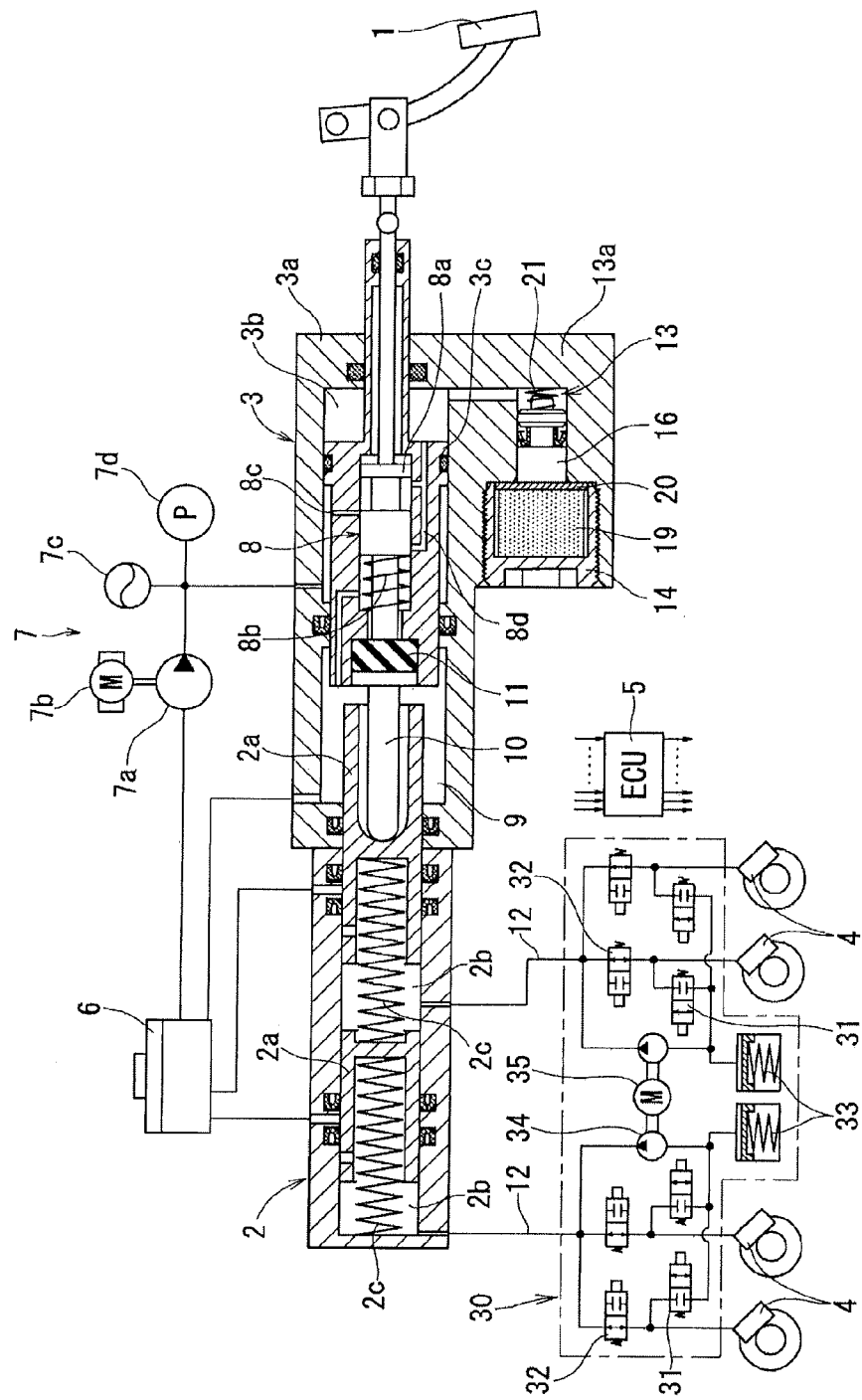
FIG. 3 is a sectional view showing an outline of a fluid pressure booster and a fluid pressure brake apparatus according to a third illustrative embodiment of the present invention.

FIG. 3 shows a fluid pressure brake apparatus of a third illustrative embodiment. The fluid pressure brake apparatus of FIG. 3 also has the damper chamber 13 which is configured as a variable volume-type chamber. Only the configuration of the damper chamber 13 is different from the first illustrative embodiment, likewise the second illustrative embodiment. Thus, only differences from the first illustrative embodiment are described.

In the fluid pressure brake apparatus of the third illustrative embodiment, the spring 18 of the damper chamber of the second illustrative embodiment is replaced with a rubber piece 19 and the retainer 17 is replaced with a backing plate 20. A reference numeral 21 indicates a spring which positions the piston 16 at an initial position. The rubber piece 19 has a gap which is a relief margin to the outer periphery at an initial state, and can be deformed due to the gap. By the deformation, the piston 16 is allowed to displace leftward in FIG. 3, and when the pump back occurs, the pressure of the boost chamber 3b displaces the piston 16 and is introduced into the damper chamber 13. Accordingly, also in the fluid pressure brake apparatus of the third illustrative embodiment, the same effects as the second illustrative embodiment of FIG. 2 are obtained.

Figure 4:
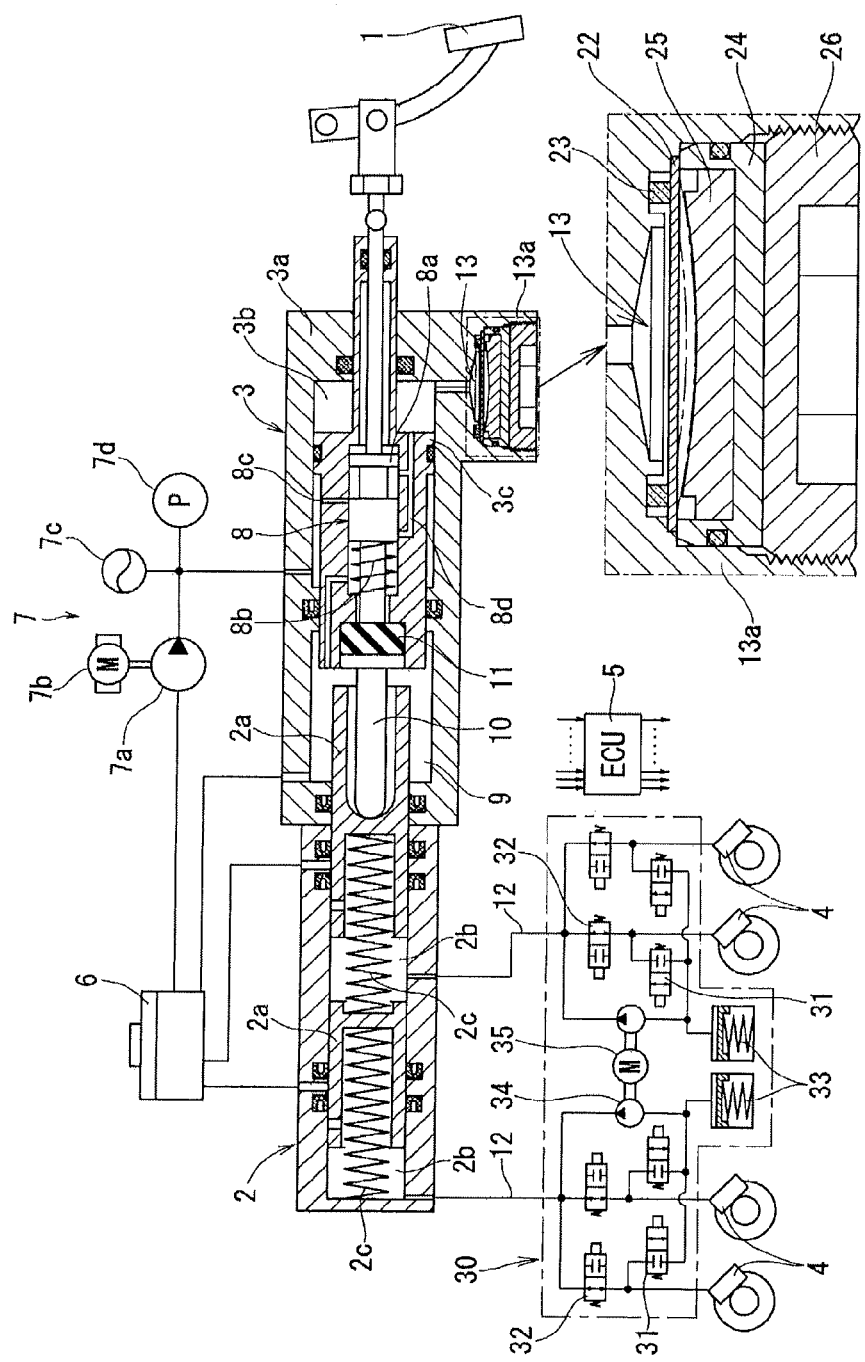
FIG. 4 is a sectional view showing an outline of a fluid pressure booster and a fluid pressure brake apparatus according to a fourth illustrative embodiment of the present invention.

FIG. 4 shows a fluid pressure brake apparatus of a fourth illustrative embodiment. The fluid pressure brake apparatus of FIG. 4 also has the damper chamber 13 which is configured as a variable volume-type chamber. A plate spring 22 which receives the boost pressure, which is introduced from the boost chamber 3b to the damper chamber 13, at one surface thereof and a seal ring 23 for fluid sealing are arranged between holes formed in the damper chamber 13 and the body 13a. Further, a plug 24, a rubber stopper 25 which limits an amount of deformation of the plate spring 22 and a lock screw 26 which fixes the plug 24 are provided in the hole of the body 13a.

The plate spring 22 receives the pressure of the boost chamber 3b at one surface thereof, and when the boost pressure exceeds a setting pressure, the plate spring is deformed by the pressure as shown with the dot-dashed line. By the deformation, the volume of the damper chamber 13 is increased, and when the pump back occurs, the pressure increase in the boost chamber 3b is suppressed. In the meantime, the stopper 25 is provided so as to prevent the plate spring 22 from being deformed beyond the limit of the elastic deformation.

Fifth to eights illustrative embodiments of the fluid pressure brake apparatus of the invention are shown in FIGS. 5 to 8, respectively. The fluid pressure brake apparatuses shown in FIGS. 5 to 8 are different from the above illustrative embodiments, in that the body 13b is provided separately from the housing 3a of the fluid pressure booster and the damper chamber 13 is provided in the body 13b and in that the damper chamber 13 is made to communicate with the pressure chamber 2b of the master cylinder.

Figure 5:
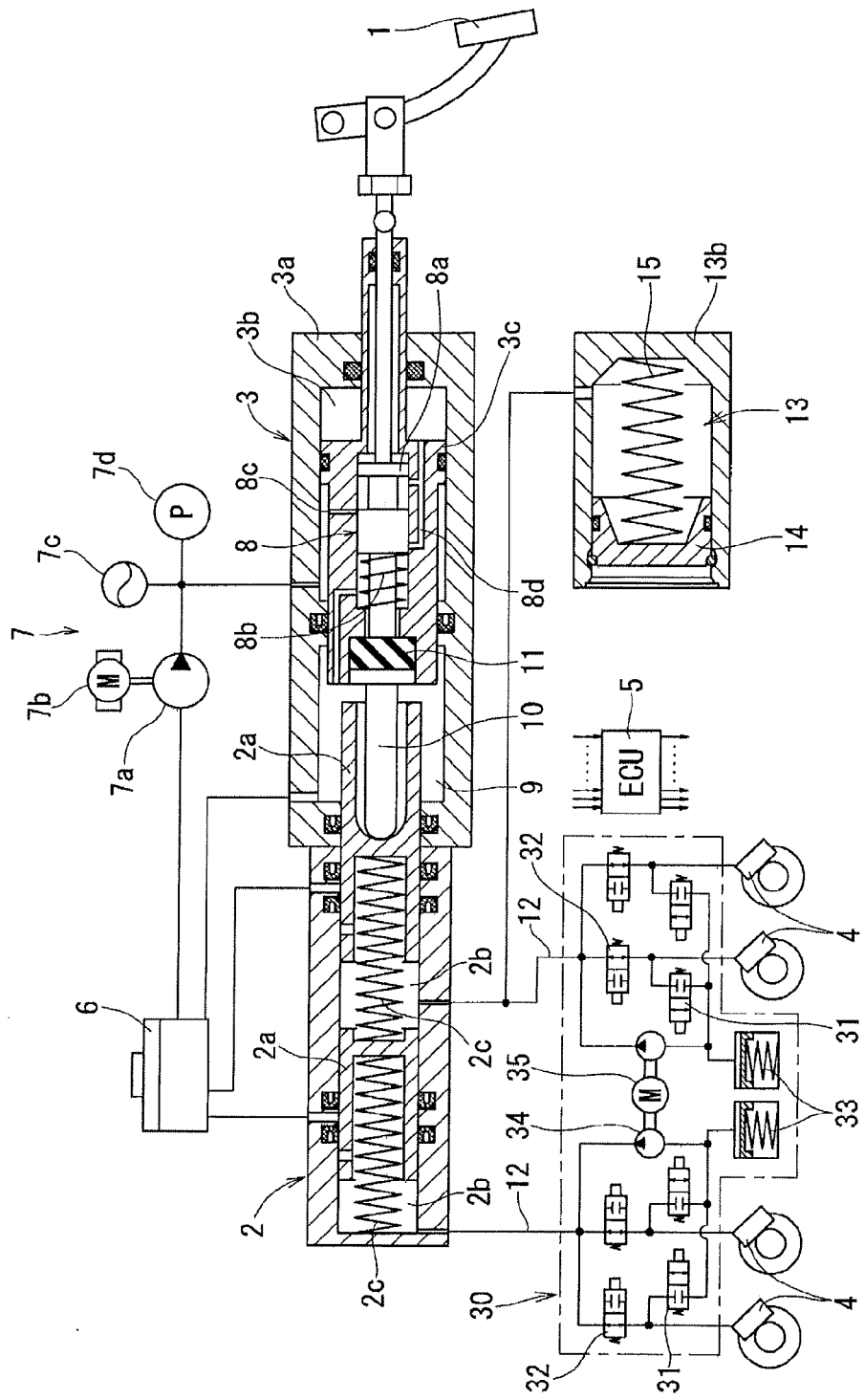
FIG. 5 is a sectional view showing an outline of a fluid pressure booster and a fluid pressure brake apparatus according to a fifth illustrative embodiment of the present invention.
Figure 6:
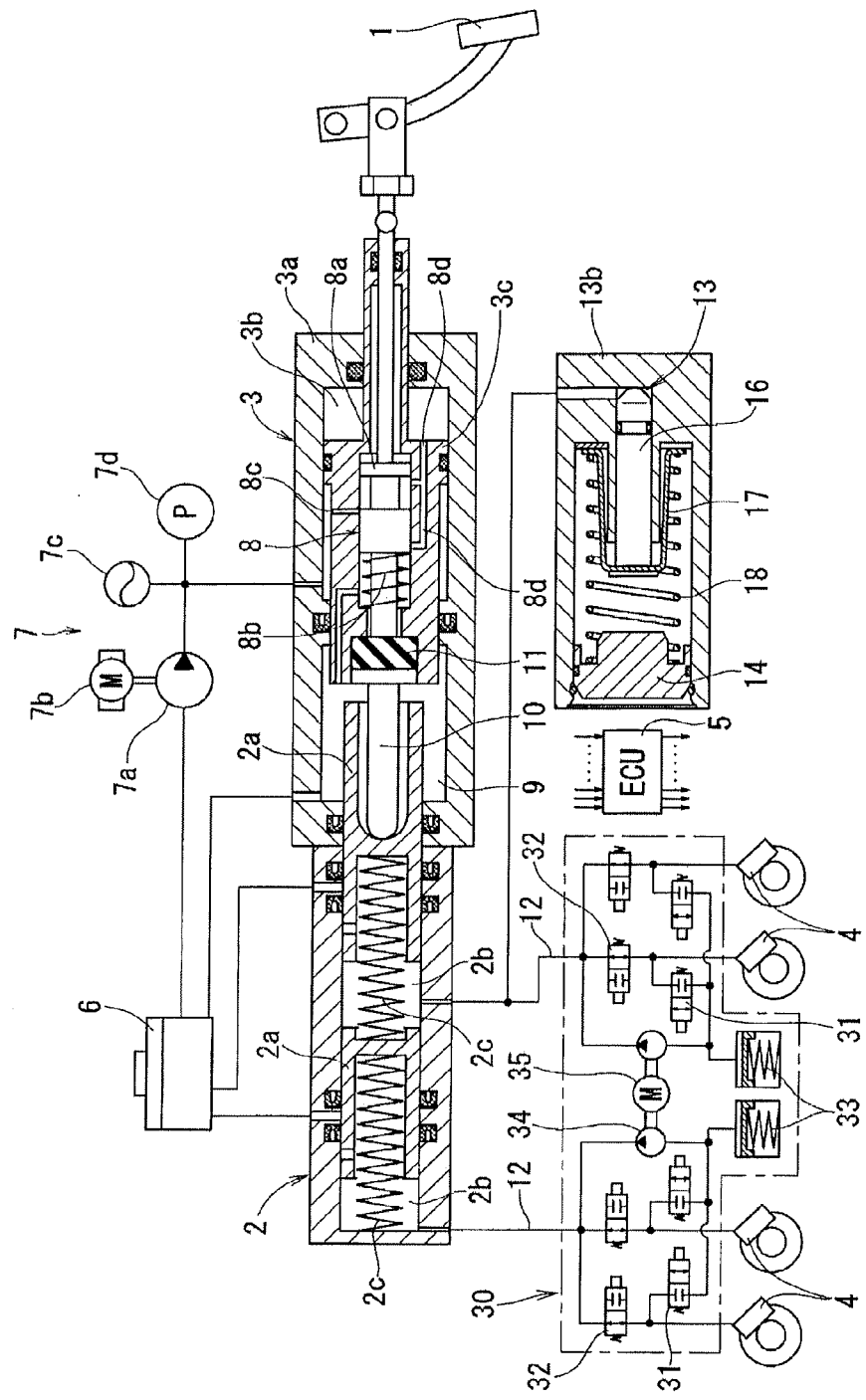
FIG. 6 is a sectional view showing an outline of a fluid pressure booster and a fluid pressure brake apparatus according to a sixth illustrative embodiment of the present invention.
Figure 7:
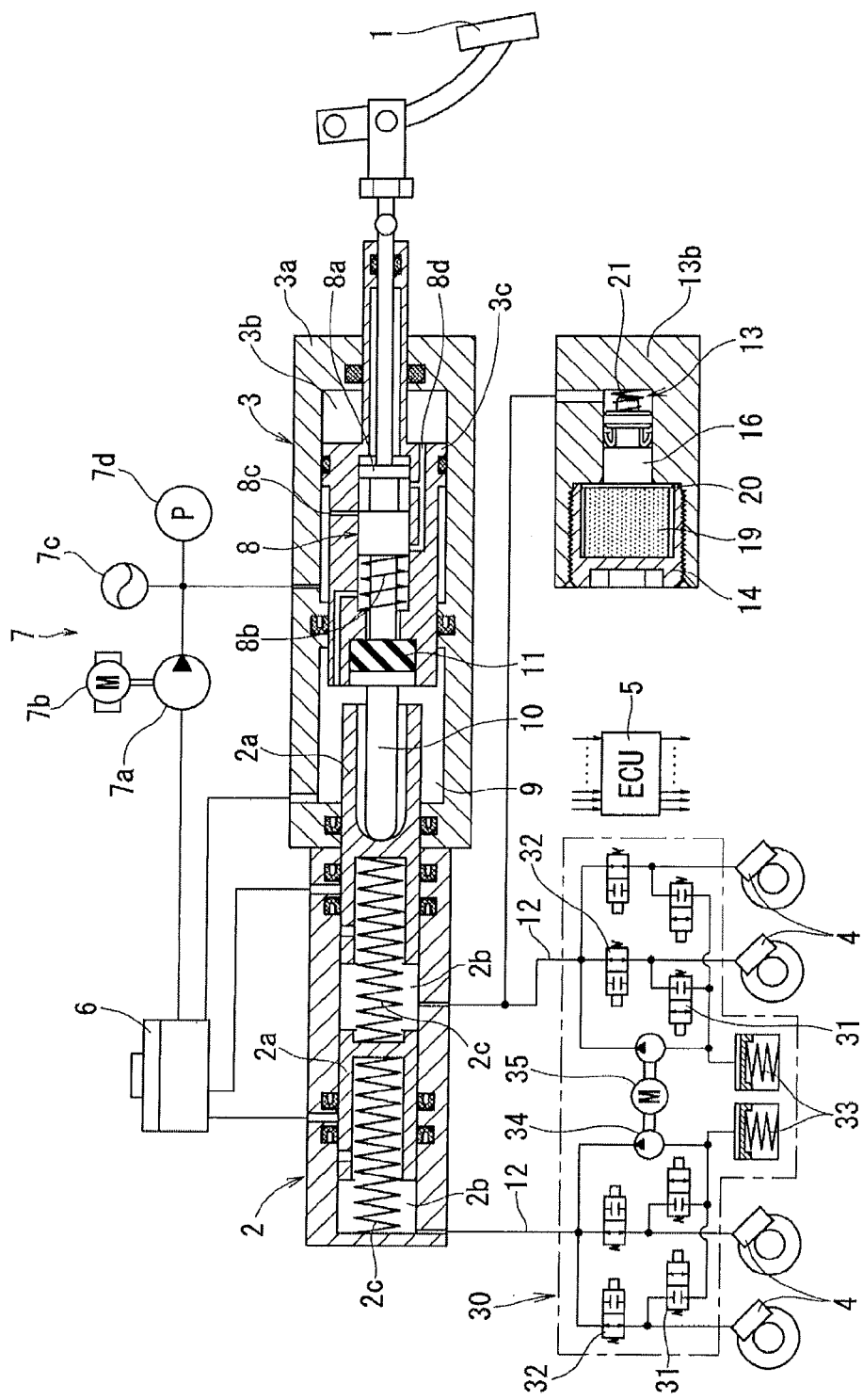
FIG. 7 is a sectional view showing an outline of a fluid pressure booster and a fluid pressure brake apparatus according to a seventh illustrative embodiment of the present invention.
Figure 8:
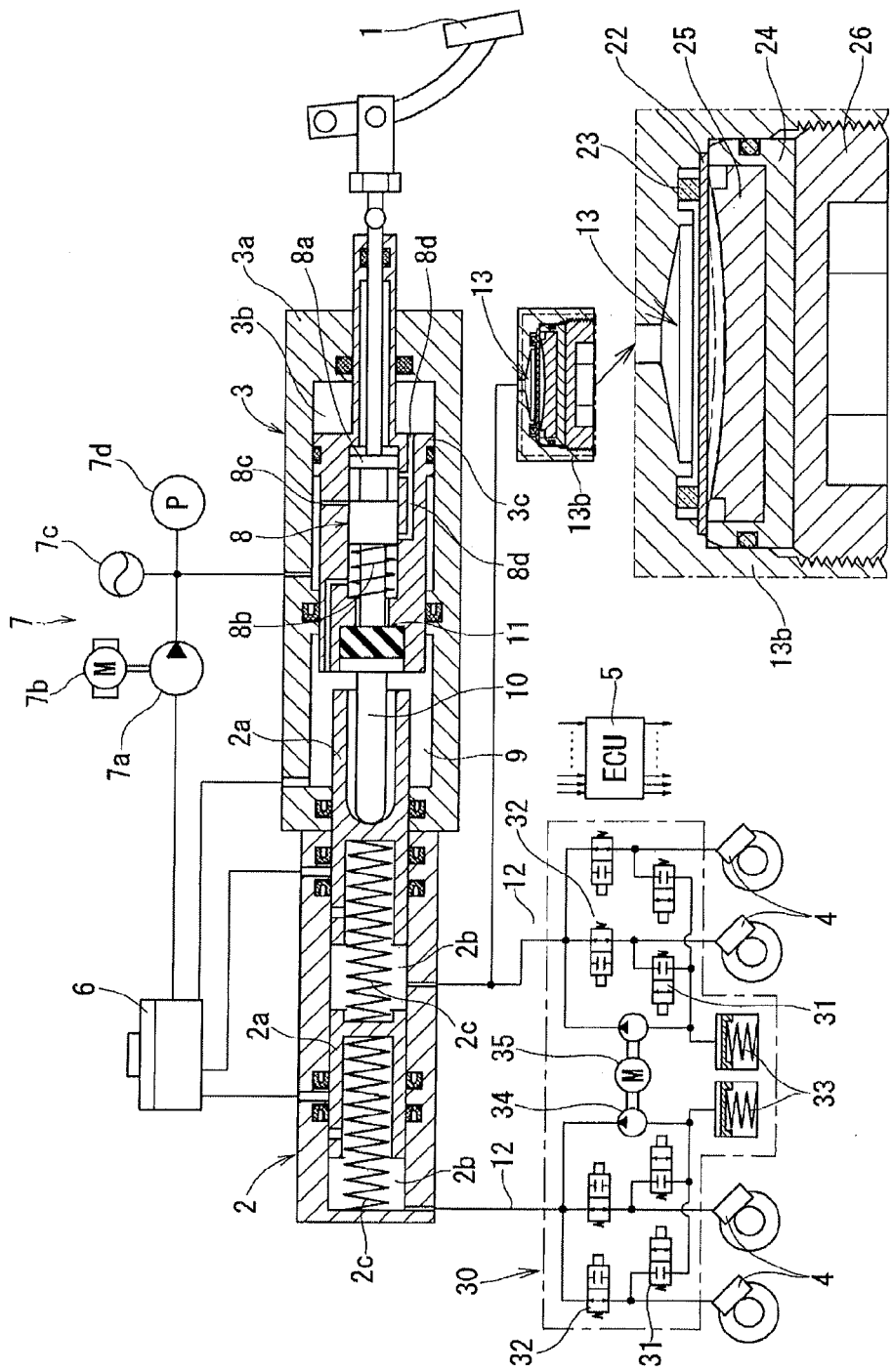
FIG. 8 is a sectional view showing an outline of a fluid pressure booster and a fluid pressure brake apparatus according to an eighth illustrative embodiment of the present invention.

The fluid pressure brake apparatus of the fifth illustrative embodiment shown in FIG. 5 is configured by enabling the damper chamber 13 of the fluid pressure brake apparatus shown in FIG. 1 to communicate with the pressure chamber 2b of the master cylinder, the fluid pressure brake apparatus of the sixth illustrative embodiment shown in FIG. 6 is configured by enabling the damper chamber 13 of the fluid pressure brake apparatus shown in FIG. 2 to communicate with the pressure chamber 2b of the master cylinder, the fluid pressure brake apparatus of the seventh illustrative embodiment shown in FIG. 7 is configured by enabling the damper chamber 13 of the fluid pressure brake apparatus shown in FIG. 3 to communicate with the pressure chamber 2b of the master cylinder, and the fluid pressure brake apparatus of the eighth illustrative embodiment shown in FIG. 8 is configured by enabling the damper chamber 13 of the fluid pressure brake apparatus shown in FIG. 4 to communicate with the pressure chamber 2b of the master cylinder.

The damper chamber 13 provided to the fluid pressure brake apparatuses of FIGS. 5 to 8 is formed in the body 13b which is provided separately from the housing 3a of the fluid pressure booster. However, the body 13b may be integrally formed with the housing 3a. Since the other configurations are the same as those of the first to fourth illustrative embodiments, the descriptions thereof are omitted.

According to the fluid pressure brake apparatuses of the fifth to eighth illustrative embodiments, the brake fluid flowing backward to the pressure chamber 2b of the master cylinder due to the pump back flows into the damper chamber 13. Thereby, the force with which the master piston 2a pushes back the boost piston 3c is relieved, so that the pressure boosting of the boost chamber 3b and the resultant pressure boosting of the master cylinder are suppressed.

When the damper chamber 13 is made to always communicate with the pressure chamber 2b of the master cylinder, like the fifth to eighth illustrative embodiments, the fluid pressure that is generated in the master cylinder 2 at the early stage of the normal braking is also introduced into the damper chamber 13. Therefore, from a standpoint of responsiveness at the time of normal braking, the first to fourth illustrative embodiments in which the damper chamber 13 is connected to the boost chamber 3b is more favorable than the fifth to eighth illustrative embodiments.

In the meantime, the effects of the present invention are also obtained in a structure where two damper chambers are provided and one damper chamber is connected to the boost chamber of the fluid pressure booster and the other damper chamber is connected to the pressure chamber of the master cylinder.

Figure 9:
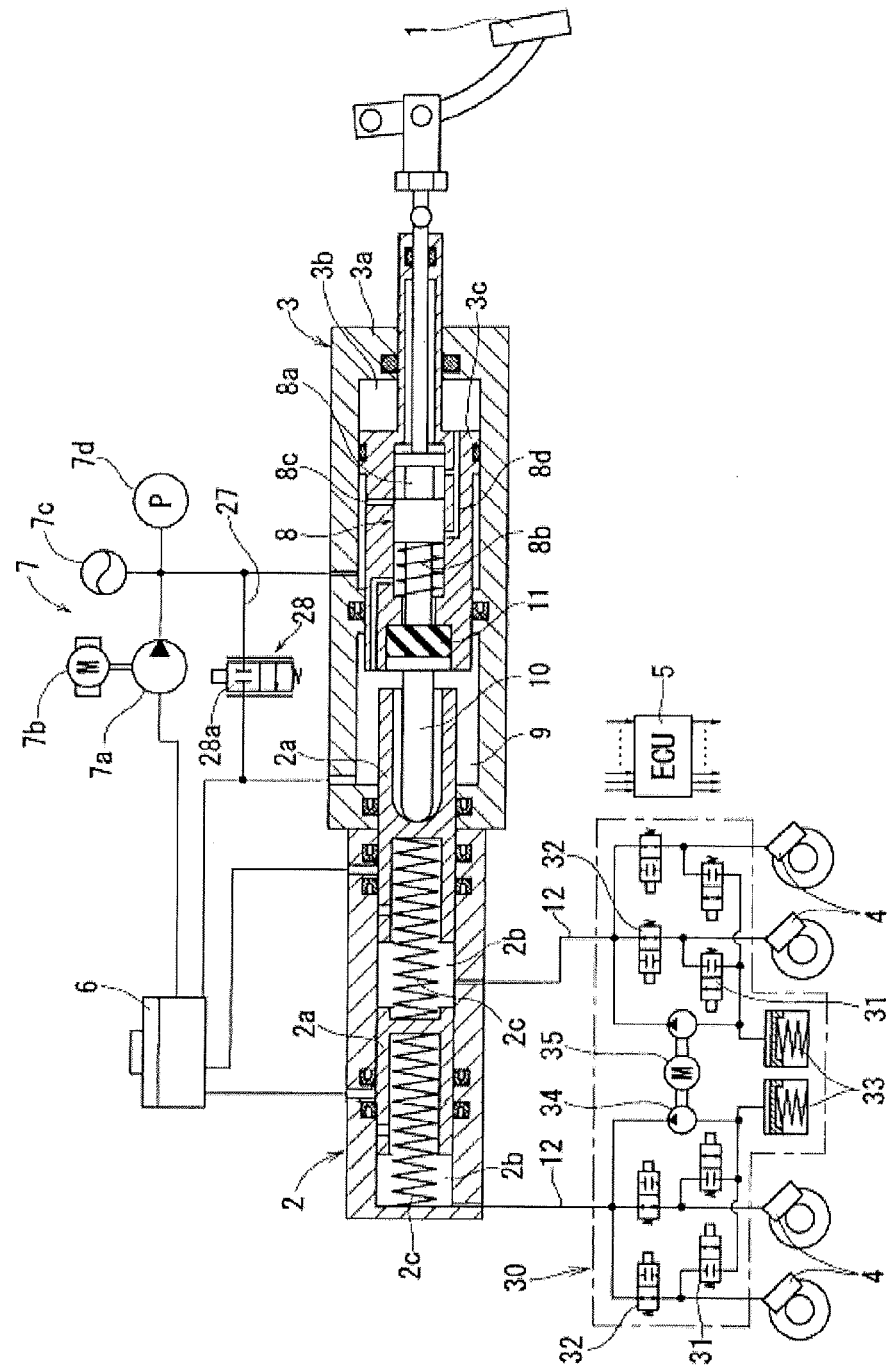
FIG. 9 is a sectional view showing an outline of a fluid pressure booster and a fluid pressure brake apparatus according to a ninth illustrative embodiment of the invention.

FIG. 9 shows a fluid pressure booster and a fluid pressure brake apparatus according to a ninth illustrative embodiment of the present invention. The fluid pressure booster and the fluid pressure brake apparatus of FIG. 9 is provided with a passage 27 which enables the pressure accumulator 7c of the auxiliary fluid pressure source 7 to communicate with a low pressure part (reservoir 6 in FIG. 9) and a relief device 28 is arranged on the passage 27.

The relief device 28 is configured by a solenoid valve 28a. Here, regarding the solenoid valve 28a, a normally closed-type proportional solenoid valve which can perform differential pressure control is adopted. Regarding the normally closed-type proportional solenoid valve which can perform differential pressure control, a normally closed-type linear valve which is disclosed in JP 2009-63024A may be used.

According to the fluid pressure brake apparatus of the ninth illustrative embodiment shown in FIG. 9, when the solenoid valve 28a is opened, the fluid pressure of the pressure accumulator 7c is released to the low pressure part, so that the fluid pressure (i.e., fluid pressure of the auxiliary fluid pressure source 7) in the pressure accumulator 7c is lowered to predetermined fluid pressure. Thereby, a situation where the spool valve 8a of the pressure adjusting device 8 can fully open the introduction passage 8c by pedal stepping force (situation where the fluid pressure of the auxiliary fluid pressure source 7 and the fluid pressure of the boost chamber 3b are the same) is made. Thereby, the pressure accumulator 7c of the auxiliary fluid pressure source 7 communicating with the boost chamber 3b is used as a damper.

Specifically, the master cylinder pressure before the pump back starts to occur (before the pressure of the wheel cylinder is boosted) is monitored by a pressure sensor (not shown) and the solenoid valve 28a is opened after the ABS control starts before the pump back starts to occur, so that the fluid pressure of the auxiliary fluid pressure source 7 is lowered and the fluid pressure of the pressure accumulator 7c is lowered to the 'predetermined fluid pressure.' Then, the solenoid valve 28a is controlled such that the 'predetermined fluid pressure' is maintained. When the solenoid valve 28a is the shown proportional solenoid valve, the driving current may be adjusted to control the degree of opening of the solenoid valve, so that the 'predetermined fluid pressure' can be maintained in high precision.

The 'predetermined fluid pressure' means the boost pressure which balances with the master cylinder pressure just before the pump back starts to occur. The start of the ABS control (flag on), which is a prior notice of the occurrence of the pump back, is a trigger which opens the solenoid valve 28a. The monitoring of the master cylinder pressure may start after or before the ABS control starts. Anyway, the 'predetermined fluid pressure' is calculated between the start of the ABS control and the start of the pump back and the solenoid valve 28a is opened to lower the fluid pressure of the auxiliary fluid pressure source 7 to the calculated fluid pressure. With this operation, the pressure accumulator 7c is enabled to function as a damper. Thereby, it is possible to suppress the abnormal increase of the master cylinder pressure and the boost pressure due to the pump back and to suppress the pulsation due to the pump back and the deterioration of the operation feeling of the brake due to the pulsation.

What is claimed is:

1. A fluid pressure brake apparatus comprising:
    a fluid pressure booster for the fluid pressure brake apparatus, the fluid pressure booster including:
    an auxiliary fluid pressure source including a power-operated pump and a pressure accumulator;
    a pressure adjusting device which adjusts fluid pressure supplied from the auxiliary fluid pressure source to a value corresponding to an operating amount of a brake operation member by displacement of a spool valve and introduces the adjusted fluid pressure into a boost chamber;
    a boost piston which receives the fluid pressure introduced into the boost chamber to generate assist force and operates a master piston of a master cylinder by assisted force;
    a damper chamber which communicates with at least one of the boost chamber and a pressure chamber of the master cylinder;
    a brake operation member which applies brake operating force to the fluid pressure booster;
    a master cylinder having the master piston which is operated while being assisted by the fluid pressure booster, the master cylinder including a pressure chamber;
    a wheel cylinder which generates braking force by fluid pressure supplied from the master cylinder;
    a reflux pressure adjusting unit including a pressure decrease solenoid valve which enables the fluid pressure of the wheel cylinder to flow out, a pressure increase solenoid valve which introduces the fluid pressure into the wheel cylinder, and a reflux pump which pumps up brake fluid having flown out from the wheel cylinder via the pressure decrease solenoid valve and thus refluxes the same to a fluid pressure path extending from the master cylinder to the wheel cylinder;
    an electronic control unit which determines whether it is necessary to decrease pressure of the wheel cylinder and whether it is necessary to re-pressurize the wheel cylinder to output an operating command to the pressure decrease solenoid valve and the pressure increase solenoid valve;
    wherein when the reflux pump is driven in response to a command from the electronic control unit during braking, the reflux pump refluxes brake fluid to the master cylinder so that a force is applied on the master piston of the master cylinder and the boost piston, and brake fluid in at least one of the pressure chamber of the master cylinder and the boost chamber is relieved to the damper chamber to suppress an increase in the pressure of at least one of the pressure chamber of the master cylinder and the boost chamber; and
    the damper chamber is connected to the boost chamber such that the damper chamber communicates with the boost chamber all the time.

2. The fluid pressure brake apparatus according to claim 1, wherein the damper chamber is a fluid storage chamber having a constant volume larger than a maximum volume of the boost chamber.

3. The fluid pressure brake apparatus according to claim 1, wherein the damper chamber is configured as a variable volume chamber having a member which receives fluid pressure of at least one of the boost chamber and the pressure chamber of the master cylinder communicating with the damper chamber and is thus displaced or deformed to increase a volume of the damper chamber.

4. The fluid pressure brake apparatus according to claim 3, wherein the member includes a piston having one end which faces the damper chamber and another end which is supported by a spring or a deformable rubber piece.

5. The fluid pressure brake apparatus according to claim 3, wherein the member includes a plate spring which receives the fluid pressure introduced into the damper chamber at one face thereof and is thus deformed, and
    wherein the damper chamber further includes a stopper which limits a deformation amount of the plate spring.

6. The fluid pressure brake apparatus according to claim 1, wherein the damper chamber is provided in a body which is integrally formed with a housing of the fluid pressure booster.

7. The fluid pressure brake apparatus according to claim 1, wherein the damper chamber is provided in a body which is formed separately from a housing of the fluid pressure booster.

* * * * *